(12) United States Patent
Kawai et al.

(10) Patent No.: US 10,933,976 B2
(45) Date of Patent: Mar. 2, 2021

(54) LEADING EDGE HIGH-LIFT DEVICE

(71) Applicant: The Boeing Company, Chicago, IL (US)

(72) Inventors: Ronald Tatsuji Kawai, Rancho Palos Verdes, CA (US); Daniel Michael Tompkins, Cypress, CA (US); Robert Hauschild Liebeck, Irvine, CA (US); Kevin Robert Elmer, Foothills Ranch, CA (US); Eric David Dickey, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 315 days.

(21) Appl. No.: 16/107,562

(22) Filed: Aug. 21, 2018

(65) Prior Publication Data
US 2019/0002084 A1 Jan. 3, 2019

Related U.S. Application Data

(62) Division of application No. 14/956,006, filed on Dec. 1, 2015, now abandoned.

(51) Int. Cl.
*B64C 9/24* (2006.01)
*B64C 3/28* (2006.01)

(52) U.S. Cl.
CPC .............. *B64C 9/24* (2013.01); *B64C 3/28* (2013.01); *B64C 2230/14* (2013.01); *Y02T 50/30* (2013.01)

(58) Field of Classification Search
CPC .. Y02T 50/30; B64C 9/24; B64C 9/26; B64C 3/28; B64C 2230/14
See application file for complete search history.

(56) References Cited

U.S. PATENT DOCUMENTS

| | | | | |
|---|---|---|---|---|
| 4,702,441 A | * | 10/1987 | Wang | B64C 9/24 244/204 |
| 5,088,665 A | * | 2/1992 | Vijgen | B64C 23/06 244/200 |
| 6,454,219 B1 | * | 9/2002 | Moe | B64C 9/24 244/214 |
| 6,857,239 B2 | | 2/2005 | Sadosky, Jr. et al. | |

(Continued)

FOREIGN PATENT DOCUMENTS

GB 419559 A 11/1934

OTHER PUBLICATIONS

Search Report for related European Application No. EP16188072.9; report dated Mar. 21, 2017.
(Continued)

*Primary Examiner* — Magdalena Topolski
*Assistant Examiner* — Marisa V Conlon
(74) *Attorney, Agent, or Firm* — Miller, Matthias & Hull LLP

(57) ABSTRACT

A leading edge high-lift device, that may be deployable from a wing of an aircraft, may include a leading edge and a trailing edge. A lower surface and an upper surface may both extend between the leading edge and the trailing edge. A trailing edge region may be defined by the trailing edge and an adjacent region thereto. A shaping device may be disposed at the trailing edge region and may be movable between a non-activated position and an activated position.

20 Claims, 4 Drawing Sheets

(56) References Cited

U.S. PATENT DOCUMENTS

| | | | | |
|---|---|---|---|---|
| 7,766,281 | B2* | 8/2010 | Lorkowski | B64C 3/50 |
| | | | | 244/215 |
| 8,231,084 | B2* | 7/2012 | Wright | B64C 9/24 |
| | | | | 244/214 |
| 8,424,810 | B1* | 4/2013 | Shmilovich | B64C 9/22 |
| | | | | 244/214 |
| 8,469,316 | B2* | 6/2013 | Hirai | B64C 9/24 |
| | | | | 244/214 |
| 8,596,585 | B2* | 12/2013 | Havar | B64C 9/24 |
| | | | | 244/214 |
| 8,596,586 | B2* | 12/2013 | Schroeder | B64C 9/24 |
| | | | | 244/214 |
| 8,657,239 | B2* | 2/2014 | Brown | B64C 9/24 |
| | | | | 244/214 |
| 9,242,720 | B2* | 1/2016 | Turner | B64C 3/48 |
| 9,505,485 | B2* | 11/2016 | Dorsett | B64C 23/06 |
| 10,183,737 | B2* | 1/2019 | Schroder | B64C 9/34 |
| 2003/0226936 | A1 | 12/2003 | Mau et al. | |
| 2010/0084508 | A1 | 4/2010 | Hirai et al. | |
| 2010/0288888 | A1 | 11/2010 | Coconnier | |
| 2012/0097791 | A1 | 4/2012 | Turner et al. | |
| 2012/0104180 | A1 | 5/2012 | Brown et al. | |
| 2012/0261517 | A1 | 10/2012 | Turner et al. | |
| 2012/0292454 | A1 | 11/2012 | Schroeder | |
| 2013/0206918 | A1* | 8/2013 | Fischer | B64C 9/323 |
| | | | | 244/215 |

OTHER PUBLICATIONS

Mehdi R. Khorrami, "Understanding Slat Noise Sources", Computational Aeroacoustics: From Acoustic Source Modeling to Far-Field Radiated Noise Prediction Colloquium EUROMECH 449, Dec. 9-12, 2003, Chamonix, France.

Anehiro Makiya, Ayumu Inasawa, and Masahito Asai, "Vortex Shedding and Noise Radiation from a Slat Trailing Edge" AIAA Journal, vol. 48, No. 2, Feb. 2010.

Yong Li, Xunnian Wang, Dejiu Zhang, "Control strategies for aircraft airframe noise reduction", Chinese Journal of Aeronautics, vol. 26, Issue 2, Apr. 2013, pp. 249-260.

Andreas Hovelmann, "Aerodynamic Investigation of Noise-Reducing High-Lift Systems for Passenger Transport Aircraft", Diploma Thesis, Department of Aeronautical and Vehicle Engineering, Royal Institute of Technology, Stockholm.

Werner Dobrzynski, "Almost 40 Years of Airframe Noise Research—What did we achieve?", DLR, Institute of Aerodynamics and Flow Technology, 14th Aeroacoustics Conference, May 5-7, 2008/ Vancouver.

Warner Dobrzynski, Roland Ewert, Michael Pott-Pollenske, Michaela Herr, Jan Delfs "Research at DLR towards airframe noise prediction and reduction" Aerospace Science and Technology 12 (2008) 80-90.

Matthew F. Barone, "Survey of Techniques for Reduction of Wind Turbine Blade Trailing Edge Noise" Sandia Report SAND2011-5252, Sandia National Laboratories, Aug. 2011.

T.P. Chong, P.F. Joseph, M. Gruber, "Airfoil self noise reduction by non-flat plate type trailing edge serrations", Applied Acoustics 74 (2013) 607-613.

* cited by examiner

LEADING EDGE HIGH-LIFT DEVICE

RELATED APPLICATIONS

This is a U.S. divisional patent application, claiming priority to U.S. Ser. No. 14/956,006, filed Dec. 1, 2015.

TECHNICAL FIELD

The present disclosure relates generally to leading edge high-lift devices and, more particularly, relates to a leading edge high-lift device for an aircraft wing.

BACKGROUND

Some modern day aircraft wings utilize leading edge high-lift devices, which may be deployed to increase lifting capacity. Common leading edge high-lift devices that may be utilized include, but are not limited to, slotted leading edge slats which have a high wing lift coefficient associated therewith. While effective, such slotted leading edge slats may generate flyover noise that propagates to the ground during flight.

SUMMARY

In accordance with an aspect of the disclosure, a leading edge high-lift device that may be deployable from a wing of an aircraft is provided. The leading edge high-lift device may include a leading edge and a trailing edge. A lower surface and an upper surface may both extend between the leading edge and the trailing edge. A trailing edge region may be defined by the trailing edge and an adjacent region thereto. A shaping device may be disposed at the trailing edge region and may be movable between a non-activated position and an activated position.

In accordance with another aspect of the disclosure, an aircraft is provided. The aircraft may include a wing. The wing may include a fixed wing section. A leading edge high-lift device may be in mechanical association with the fixed wing section and may be movable between a retracted position and a deployed position relative to the fixed wing section. A shaping device may be disposed at a trailing edge region of the leading edge high-lift device and may be movable between a non-activated position and an activated position.

In accordance with yet another aspect of the disclosure, a sample sequence of steps which may be performed to reduce noise generated at a trailing edge of a leading edge high-lift device is provided. The sample sequence of steps may entail deploying the leading edge high-lift device from a retracted position. Another step may be activating a shaping device disposed at a trailing edge region of the leading edge high-lift device to extend noise generation further downstream and provide wing shielding for flyover noise.

The features, functions, and advantages that have been discussed can be achieved independently in various embodiments or may be combined in yet other embodiments further details of which can be seen with reference to the following description and drawings.

DETAILED DESCRIPTION

Figure 1:
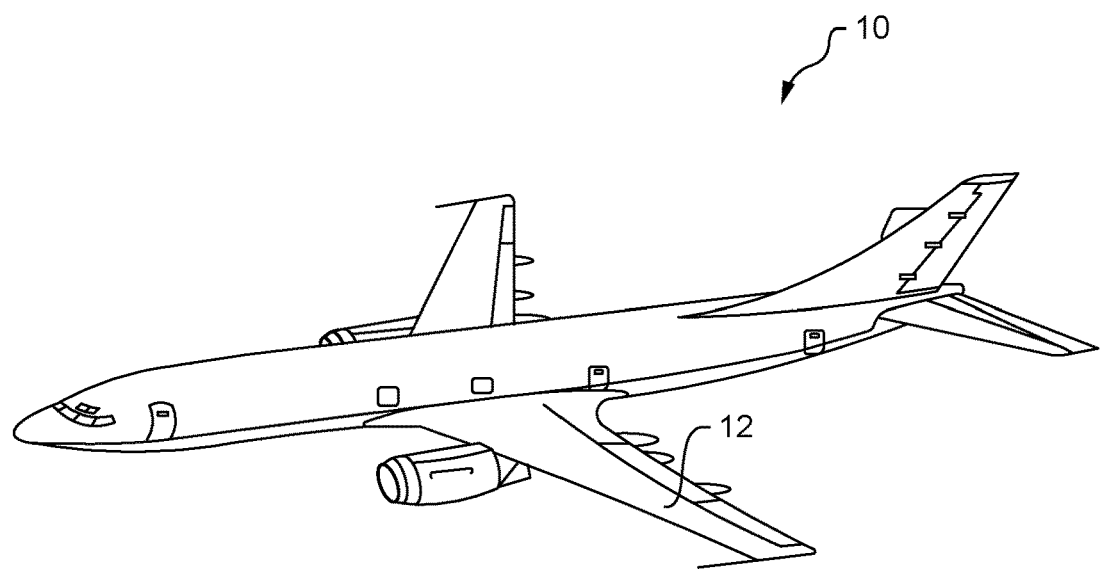
FIG. 1 is a perspective view of an illustrative aircraft, in accordance with an embodiment of the present disclosure.
Figure 2:
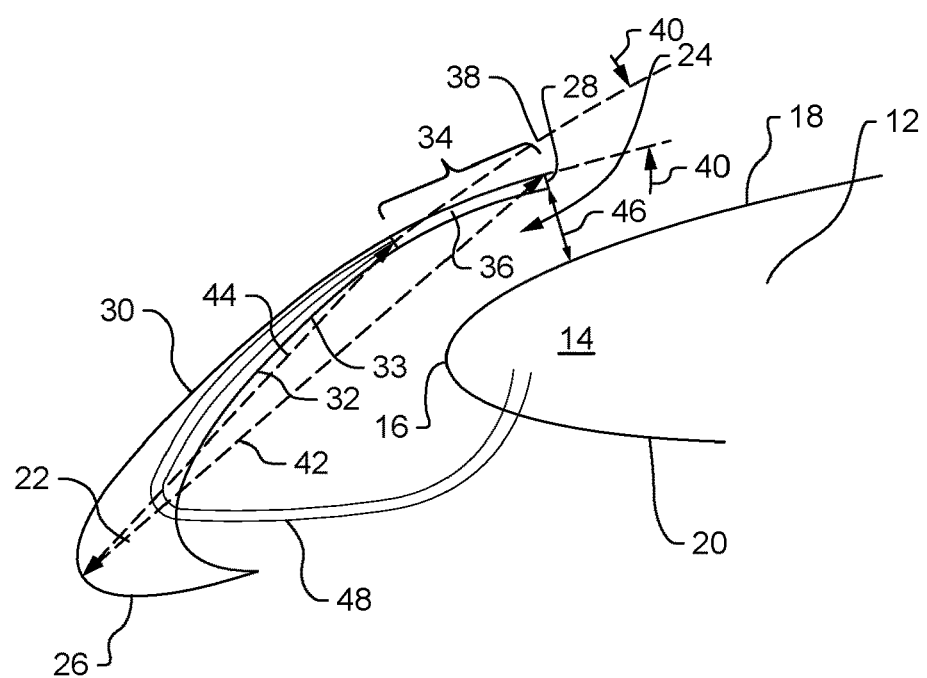
FIG. 2 is a schematic side view, in section and with portions omitted for clarity, of an illustrative leading edge high-lift device in a deployed position relative to an aircraft wing, in accordance with an embodiment of the present disclosure.

Referring now to FIG. 1, an exemplary aircraft constructed in accordance with the present disclosure is generally referred to by reference numeral 10. The aircraft 10 may include a wing 12. As shown in more detail in FIG. 2, the wing 12 includes a fixed wing section 14 including a wing leading edge 16, a wing upper surface 18, and a wing lower surface 20 such that the wing upper surface 18 and the wing lower surface 20 converge at the wing leading edge 16. The fixed wing section 14 may be in mechanical association with a leading edge high-lift device 22 that is moveable between a deployed position (as shown in FIG. 2) and a retracted position by various actuation mechanisms, which have been omitted from FIG. 2 for clarity. The leading edge high-lift device 22 may be a leading edge slat such as, but not limited to, a translating slotted slat or a Krueger slotted slat. With the leading edge high-lift device 22 in the deployed position, a channel 24 is formed between the fixed wing section 14 and the leading edge high-lift device 22.

The leading edge high-lift device 22 may include a device leading edge 26, a device trailing edge 28, a device upper surface 30, and a device lower surface 32. The device upper surface 30 and the device lower surface 32 may extend between the device leading edge 26 and the device trailing edge 28. The device lower surface 32 may include an acoustic treatment 33 to absorb high frequency noise. A region of the leading edge high-lift device 22 adjacent to, and including, the device trailing edge 28 will be hereinafter referred to as the device trailing edge region 34. The device trailing edge region 34 is an extension that may be integral to the leading edge high-lift device 22 or may be mechanically coupled to the leading edge high-lift device 22. The device trailing edge region 34 may include a shaping device 36 that may be activated to transition from a non-activated position to an activated position.

In an embodiment, the device trailing edge region 34 may be any shape memory alloy or smart metal that is well known in the industry. Moreover, the shaping device 36 may be activated with heated such that the device trailing edge region 34 may transition to the activated position (shown in FIG. 2) from the non-activated position, as illustrated by dotted line 38. As such, the device trailing edge 28 may deflect downwardly away, in a curved profile, from the non-activated position 38 to the activated position by an angle 40. As a non-limiting example, the angle 40 may be in the approximate range of 10 to 15 degrees. When the device trailing edge region 34 is in the activated position the device trailing edge 28 is shifted aft, as compared to the leading edge high-lift device 22 without the device trailing edge region 34, so as to shield flyover noise that may be generated from the deployed leading edge high-lift device 22 while also maintaining high lift performance.

Further, the leading edge high-lift device 22 includes an extended chord 42 (illustrated as dotted lines). As a non-limiting example, the extended chord 42 may be approximately 20% longer than an abridged chord 44 (illustrated as dotted lines), which is the chord of the leading edge high-lift device 22 measured without the device trailing edge region 34. It will be appreciated, however, that the extended chord 42 may be any percentage longer than the abridged chord 44 based on specific applications. In an embodiment, the abridged chord 44 may be approximately 12% to 20% of the chord of wing 12.

When the shaping device 36 is activated such that the device trailing edge region 34 is in the activated position, a channel distance 46 may be measured between the channel 24 from the device trailing edge 28 to the fixed wing section 14. As a non-limiting example, the channel distance 46 may be in the approximate range of 4% to 14% of the extended chord 42.

A retractable conduit 48 may retractably couple the fixed wing section 14 to the shaping device 36 of the leading edge high-lift device 22. The conduit 48 may selectively deliver heat to activate the shaping device 36, such as, but not limited to, a shape metal actuator. As non-limiting examples, the conduit 48 may route hot air from an anti-icing system of the fixed wing section 14 to apply heat to the shaping device 36 or may include wiring from the fixed wing section 14 to provide electric heating to the shaping device 36. When the leading edge high-lift device 22 is in the deployed position, the shaping device 36 may be activated by applying heat thereto via the conduit 48 such that the shaping device 36 deflects downward by angle 40, in a substantially curved profile, towards the fixed wing section 14 until reaching the activated position. Before the leading edge high-lift device 22 transitions back to the retracted position, the shaping device 36 may be deactivated by removing the heat from the shaping device 36 such that the device trailing edge region 34 reverts back to the non-activated position, by restoring loads acted thereupon or by a second shaping device 36 activated to restore to the non-activated position, when the leading edge high-lift device 22 transitions back to the retracted position.

Figure 3:
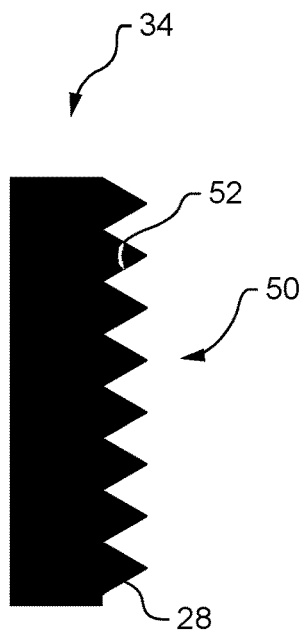
FIG. 3 is a top view of an illustrative embodiment of a shaping device of a device trailing edge region of the leading edge high-lift device of FIG. 2, in accordance with an embodiment of the present disclosure.

In an embodiment illustrated in FIG. 3, the device trailing edge region 34 may include a device trailing edge 28 including a serrated profile 50. In an embodiment, the serrated profile 50 may be contiguous triangles such that each triangle includes a trailing edge closure angle or serrated profile angle 52, which may be in the approximate range of 30 to 60 degrees, at the device trailing edge 28. The serrated profile 50 of the device trailing edge 28 may extend the distribution of the trailing edge pressure differential distance aftward such that the intensity of the vortices, and thereby the noise source strength, may be extended aft such that the fixed wing section 14 shields the flyover noise.

Figure 4:
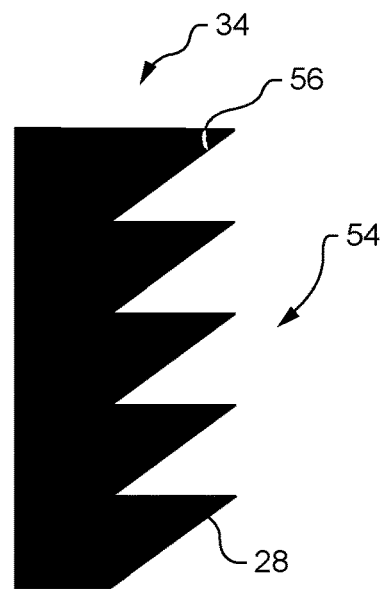
FIG. 4 is a top view of illustrative alternative embodiment of a shaping device of a device trailing edge region of the leading edge high-lift device of FIG. 2, in accordance with an embodiment of the present disclosure.

In an alternative embodiment illustrated in FIG. 4, the device trailing edge region 34 may include a device trailing edge 28 including a saw tooth profile 54. In an embodiment, the saw tooth profile 54 may be contiguous right angle triangles such that each right angle triangle includes a saw tooth profile angle 56, which may be, but not limited to, approximately 30 degrees, at the device trailing edge 28. The saw tooth profile 54 of the device trailing edge 28 may extend the noise generation further downstream to provide increased wing shielding for flyover noise.

Figure 5:
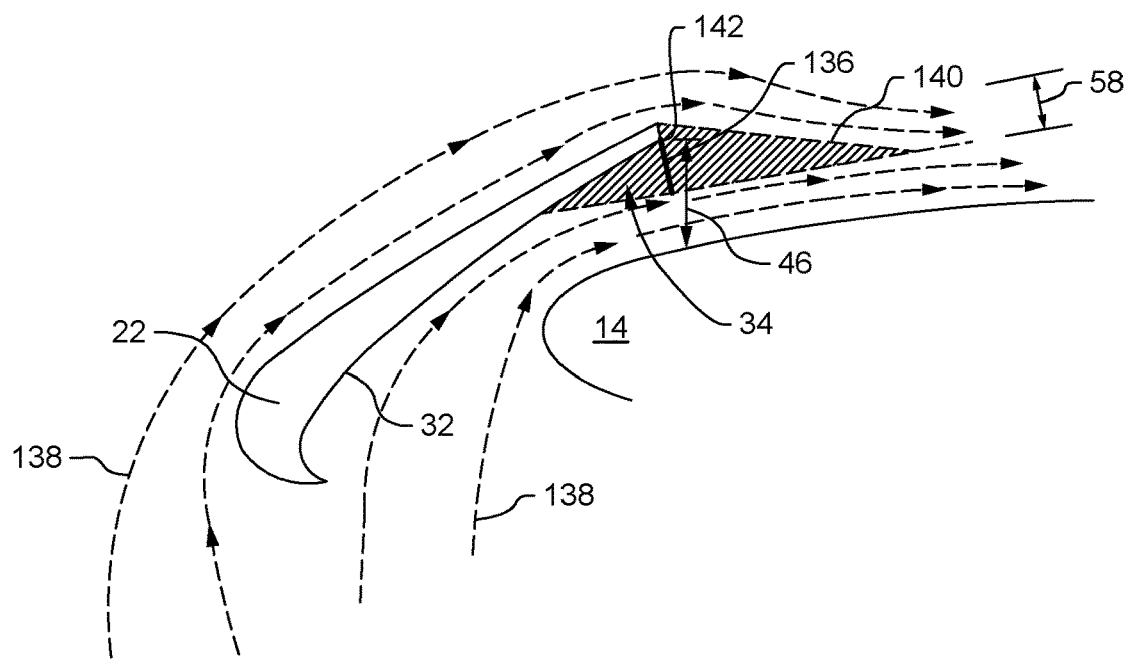
FIG. 5 is a schematic side view, in section and with portions omitted for clarity, of a further illustrative alternative embodiment of a shaping device of a device trailing edge region of the leading edge high-lift device of FIG. 2 illustrating air flow paths around such shaping device, in accordance with an embodiment of the present disclosure.

Referring to FIG. 5, the device trailing edge region 34 may include an alternative embodiment shaping device 136 hingedly coupled to the device lower surface 32 in the device trailing edge region 34. When the leading edge high-lift device 22 is in the deployed position, as illustrated, the shaping device 136 may be activated by aerodynamic forces to transition from a non-activated, stowed position to an activated position. Although not illustrated to scale, in an embodiment, the shaping device 136 may extend downward into the separated circulating airflow 138 at a shaping distance 58, which may be, but not limited to, approximately 2% to 5% of the channel distance 46. With the shaping device 136 in the activated position, the separated circulating airflow 138 around the shaping device 136 may form a virtual body 140 (illustrated in dotted lines in FIG. 5), creating a virtual extension of the device trailing edge 28, to maintain high lift performance, eliminate high intensity noise from the device trailing edge 28, and extend the noise generation further downstream to provide increased wing shielding for flyover noise.

Figure 6:
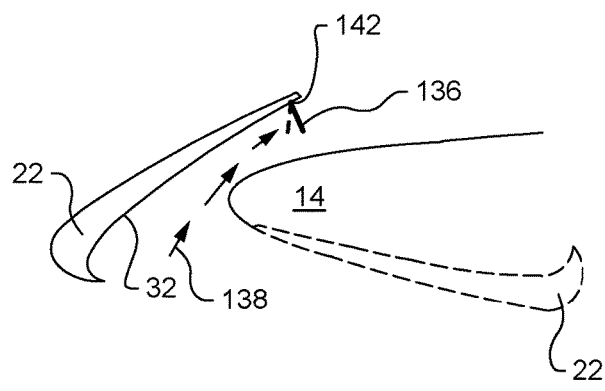
FIG. 6 is a schematic side view, in section and with portions omitted for clarity, of the illustrative shaping device of FIG. 5 in an activated position in association with a Krueger slat, in accordance with an embodiment of the present disclosure.
Figure 7:
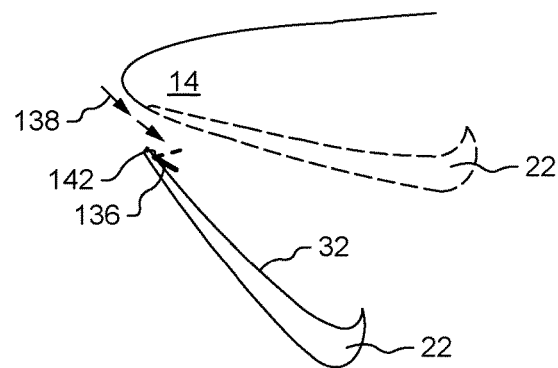
FIG. 7 is a schematic side view, in section and with portions omitted for clarity, of the shaping device of FIG. 6 transitioning to a non-activated position, in accordance with an embodiment of the present disclosure.

As one detailed example, the shaping device 136 may be utilized in association with a leading edge high-lift device 22 such as the Krueger slat illustrated in FIGS. 6 and 7. As illustrated in FIG. 6, the leading edge high-lift device 22 is in the deployed position such that the airflow 138 forces the shaping device 136, in the non-activated, stowed position, to hingedly move outwardly away from the device lower surface 32 to the activated position, where the shaping device 136 is prevented from further movement by stop 142. As illustrated in FIG. 7, when the leading edge high-lift device 22 transitions back to the retracted position (shown in dotted lines in FIGS. 6 and 7), the airflow 138 forces the shaping device 136 to hingedly move back to the non-activated, stowed position.

Figure 8:
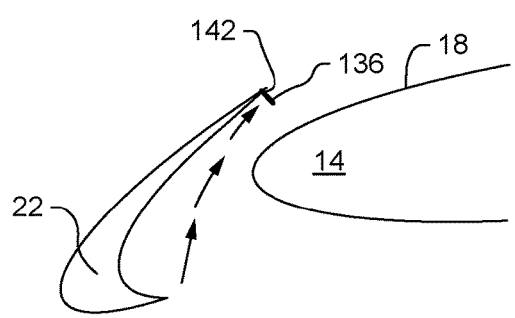
FIG. 8 is a schematic side view, in section and with portions omitted for clarity, of the illustrative shaping device of FIG. 5 in an activated position in association with a translating slat, in accordance with an embodiment of the present disclosure.
Figure 9:
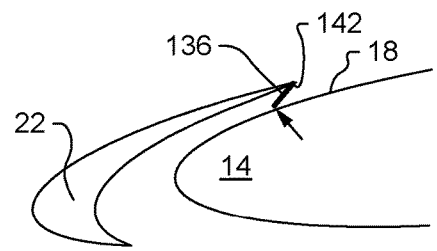
FIG. 9 is a schematic side view, in section and with portions omitted for clarity, of the illustrative shaping device of FIG. 8 transitioning to a non-activated position, in accordance with an embodiment of the present disclosure.

In another detailed example, the shaping device 136 may be utilized in association with a leading edge high-lift device 22 such as the translating slat illustrated in FIGS. 8 and 9. With the leading edge high-lift device 22 translated to the deployed position, as illustrated in FIG. 8, the airflow 138 similarly forces the shaping device 136 to hingedly move into the activated position against stop 142. As illustrated in FIG. 9, when the leading edge high-lift device 22 transitions back to the retracted position, the shaping device 136 comes into physical contact with the wing upper surface 18 such that the shaping device 136 is forced into the non-activated, stowed position.

In an alternative embodiment, the shaping device 136 may be spring loaded. In a further alternative embodiment, the shaping device 136 may be fixed to the device lower surface 32 in the device trailing edge region 34.

INDUSTRIAL APPLICABILITY

Based on the foregoing, it can be seen that the present disclosure sets forth a shaping device of a leading edge high-lift device for reducing noise while maintaining aerodynamic efficiency. Moreover, the shaping device may maintain high lift performance while reducing noise source intensity by shifting the noise generation aft to reduce flyover noise. In operation, the leading edge high-lift device 22 may be deployed to increase the lift capabilities of the aircraft 10. With the leading edge high-lift device 22 in the deployed position, the shaping device 36, 136 may be activated to reduce trailing edge noise.

As one illustrative example, the shaping device 36 may be activated by applying heat, either hot airflow or electric heating, via the conduit 48 such that the device trailing edge region 34, while extended aft of the wing leading edge 16, deflects downward, in a substantially curved profile, towards the fixed wing section 14 until reaching the activated position. The extended, substantially curved profile of the device trailing edge region 34 may create a converging flow area that reduces the line of sight noise propagation such that the strength of the vortices at the device trailing edge 28 are reduced thereby also reducing noise generation. Moreover, in alternative embodiments, the device trailing edge region 34 may include a device trailing edge 28 with either a serrated profile or a saw tooth profile to further reduce the noise source strength such that the distribution of the trailing edge pressure differential distance may be extended aftward to reduce intensity of the vortices and provide increased wing shielding for flyover noise. Before the leading edge high-lift device 22 transitions back to the retracted position, the shaping device 36 may be deactivated by removing the heat from the shaping device 36 such that the device trailing edge region 34 reverts back to the non-activated position when the leading edge high-lift device 22 is retracted.

As another illustrative example, the shaping device 136 may be activated by aerodynamic forces, from the non-activated, stowed position, to hingedly move outwardly away from the device lower surface 32 to the activated position, where the shaping device 136 is prevented from further movement by stop 142. With the shaping device 136 in the activated position, the separated circulating airflow 138 around the shaping device 136 may form a virtual body 140 that extends the noise generation further downstream producing increased wing shielding for flyover noise, thereby reducing noise source strength. When the leading edge high-lift device 22 transitions back to the retracted position, in one embodiment, the airflow 138 forces the shaping device 136 to hingedly move back to the non-activated, stowed position, and in another embodiment, the shaping device 136 comes into physical contact with the wing upper surface 18 such that the shaping device 136 is forced into the non-activated, stowed position.

Figure 10:
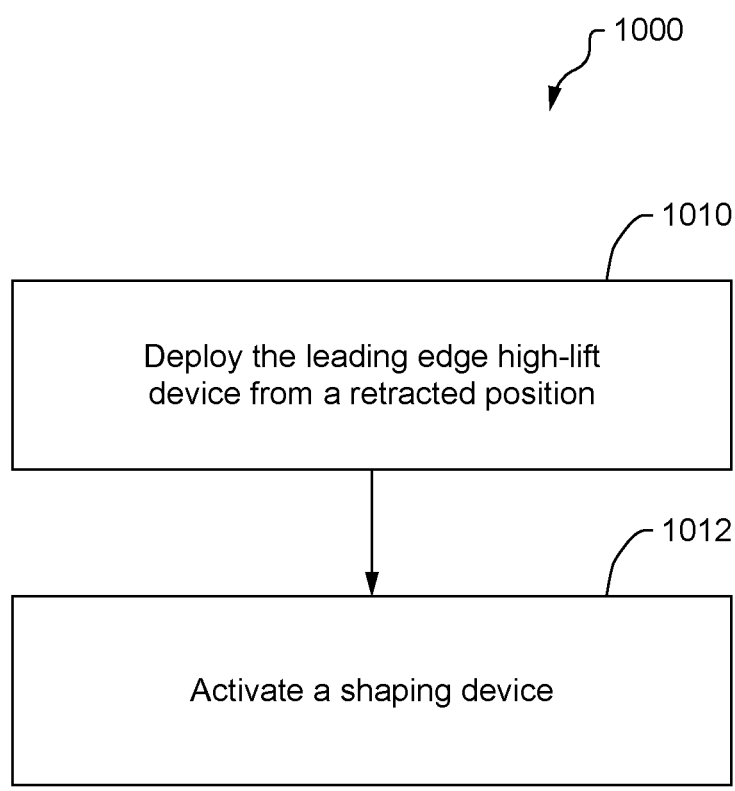
FIG. 10 is an illustration of a sample sequence of steps which may be practiced in accordance with an embodiment of the present disclosure.

FIG. 10 illustrates a sample sequence of steps which may be practiced to reduce noise generated at a trailing edge of a leading edge high-lift device while maintaining aerodynamic efficiency. Box 1010 illustrates deploying the leading edge high-lift device from a retracted position. Another step, as illustrated in box 1012, may be activating a shaping device disposed at a trailing edge region of the leading edge high-lift device to extend noise generation further downstream and provide wing shielding for flyover noise. The step of activating the shaping device may further include the step of delivering hot air to the shaping device. Further, the step of activating the shaping device may include an alternative step of delivering electric heating to the shaping device. Moreover, the step of activating the shaping device may include another alternative step of activating the shaping device via aerodynamic forces.

What is claimed is:

1. A leading edge high-lift device deployable from a wing of an aircraft, the leading edge high-lift device comprising:
   a leading edge;
   a trailing edge;
   a lower surface and an upper surface both extending between the leading edge and the trailing edge;
   a trailing edge region being defined by the trailing edge and an adjacent region thereto;
   a shaping device disposed at the trailing edge region, the shaping device moveable between a non-activated position and an activated position, wherein, when the leading edge high-lift device is deployed, a channel is formed between the wing of the aircraft and the trailing edge of the leading edge high-lift device; and
   wherein the shaping device is activated by aerodynamic force of airflow through the channel to transition from at least one of the non-activated and the activated positions.

2. The leading edge high-lift device of claim 1, wherein the shaping device is retracted against the trailing edge in the non-activated position.

3. The leading edge high-lift device of claim 1, wherein the leading edge high-lift device comprises a Krueger slat or a translating slat.

4. The leading edge high-lift device of claim 3, wherein the trailing edge includes a saw tooth profile.

5. The leading edge high-lift device of claim 3, wherein the trailing edge includes a serrated profile.

6. The leading edge high-lift device of claim 1, wherein the shaping device is hingedly coupled to the lower surface at the trailing edge.

7. The leading edge high-lift device of claim 6, wherein the shaping device engages a stop in the activated position.

8. The leading edge high-lift device of claim 1, wherein the lower surface includes an acoustic treatment.

9. An aircraft, the aircraft comprising:
   a wing including a fixed wing section;
   a leading edge high-lift device in mechanical association with the fixed wing section, the leading edge high-lift device movable between a retracted position and a deployed position relative to the fixed wing section;
   a shaping device disposed at a trailing edge of the leading edge high-lift device, the shaping device movable between a non-activated position and an activated position, wherein, when the leading edge high-lift device is deployed, a channel is formed between the fixed wing section and the trailing edge of the leading edge high-lift device; and
   wherein the shaping device is activated by aerodynamic force of airflow through the channel to transition from at least one of the non-activated and the activated positions.

10. The aircraft of claim 9, wherein the shaping device is retracted against the trailing edge in the non-activated position.

11. The aircraft of claim 9, wherein the shaping device is hingedly coupled to the lower surface at the trailing edge.

12. The aircraft of claim 9, wherein the shaping device engages a stop in the activated position.

13. The aircraft of claim 9, wherein the lower surface includes an acoustic treatment.

14. The aircraft of claim 12, wherein the trailing edge includes a saw tooth profile.

15. The aircraft of claim 9, wherein the trailing edge includes a serrated profile.

16. The aircraft of claim 9, wherein the leading edge high-lift device is a Krueger slat or a translating slat.

17. A method of reducing noise generated at a trailing edge of a leading edge high-lift device deployable from an aircraft wing, the method comprising:
   deploying the leading edge high-lift device from a retracted position;
   activating a shaping device disposed at a trailing edge region of the leading edge high-lift device to extend noise generation further downstream and provide wing shielding for flyover noise, such that when the leading edge high-lift device is deployed, a channel is formed between the aircraft wing and the trailing edge of the leading edge high-lift device; and
   activating the shaping device by aerodynamic force of airflow through the channel when the leading edge high-lift device is deployed.

18. The method of claim 17, further comprising hingedly coupling the shaping device to a lower surface of the trailing edge.

19. The method of claim 17, further comprising forming a stop for the shaping device to engage while the leading edge high-lift device is deployed.

20. The method of claim 19, further comprising forming the leading edge high-lift device as one of a Krueger slat or a translating slat.

* * * * *